Feb. 17, 1931.  R. C. RASMUSSEN  1,793,248
HIGH FREQUENCY ELECTRICAL APPARATUS
Filed Feb. 14, 1925    3 Sheets-Sheet 3

Inventor
Roswell C. Rasmussen
by
Matthison. Att'y.

Patented Feb. 17, 1931

1,793,248

UNITED STATES PATENT OFFICE

ROSWELL CLARENCE RASMUSSEN, OF ELGIN, ILLINOIS, ASSIGNOR TO WESTERN ELECTRIC COMPANY, INCORPORATED, OF NEW YORK, N. Y., A CORPORATION OF NEW YORK

HIGH-FREQUENCY ELECTRICAL APPARATUS

Application filed February 14, 1925. Serial No. 9,153.

This invention relates to high frequency electrical apparatus, and more particularly to an electrical oscillator.

The primary object of the invention is to provide a high frequency electrical apparatus which will operate efficiently with low maintenance cost.

One embodiment of the invention contemplates the provision of an oscillator which comprises metallic electrodes having water cooled separable tips cooperating with a mercury electrode. The metallic electrodes project through the cover of a pot which holds the mercury electrode, a mercury seal being provided between the pot and its cover so that a hydrocarbonaceous atmosphere may be easily maintained within the pot.

Other objects and features of the invention will become apparent as the following detailed description progresses, reference being had to the accompanying drawings, wherein Fig. 1 shows an electrical circuit, including an oscillator embodying the invention for supplying high frequency current to a heating coil;

Fig. 4 is an enlarged central sectional view through one of the metallic electrodes forming part of the oscillator.

Figure 1:
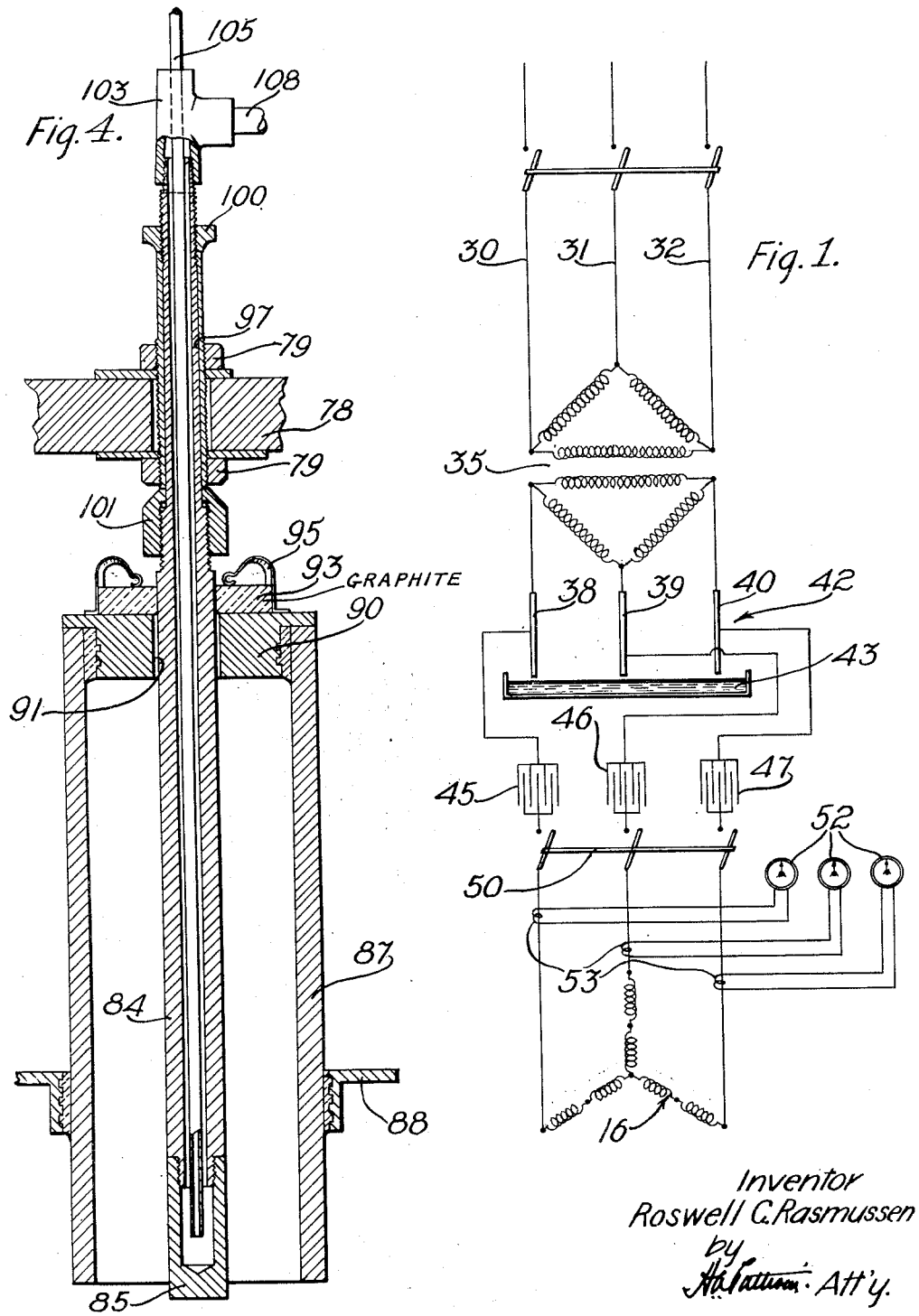

Referring to Fig. 1, the numeral 16 designates a heating coil of an electrical heating apparatus (not shown) supplied with high frequency electrical current by a three-phase circuit which comprises mains 30, 31 and 32 connected to the primary winding of a step-up transformer 35 having a secondary winding connected to metallic electrodes 38, 39 and 40, these electrodes being parts of an oscillator 42 which also comprises a mercury electrode 43. The metallic electrodes 38, 39 and 40 are connected to condensers 45, 46 and 47, respectively, which are connected through a switch 50 to the coil 16. Interposed between the switch 50 and the coil 16 are a plurality of indicating devices 52, each indicating device 52 being coupled by a winding 53 with one of the phases of the circuit and being independent of the remaining phases. Each indicating device 52 is preferably of the thermo-ammeter type and is adapted to indicate the current flowing in the phase with which it is associated.

Figure 2:
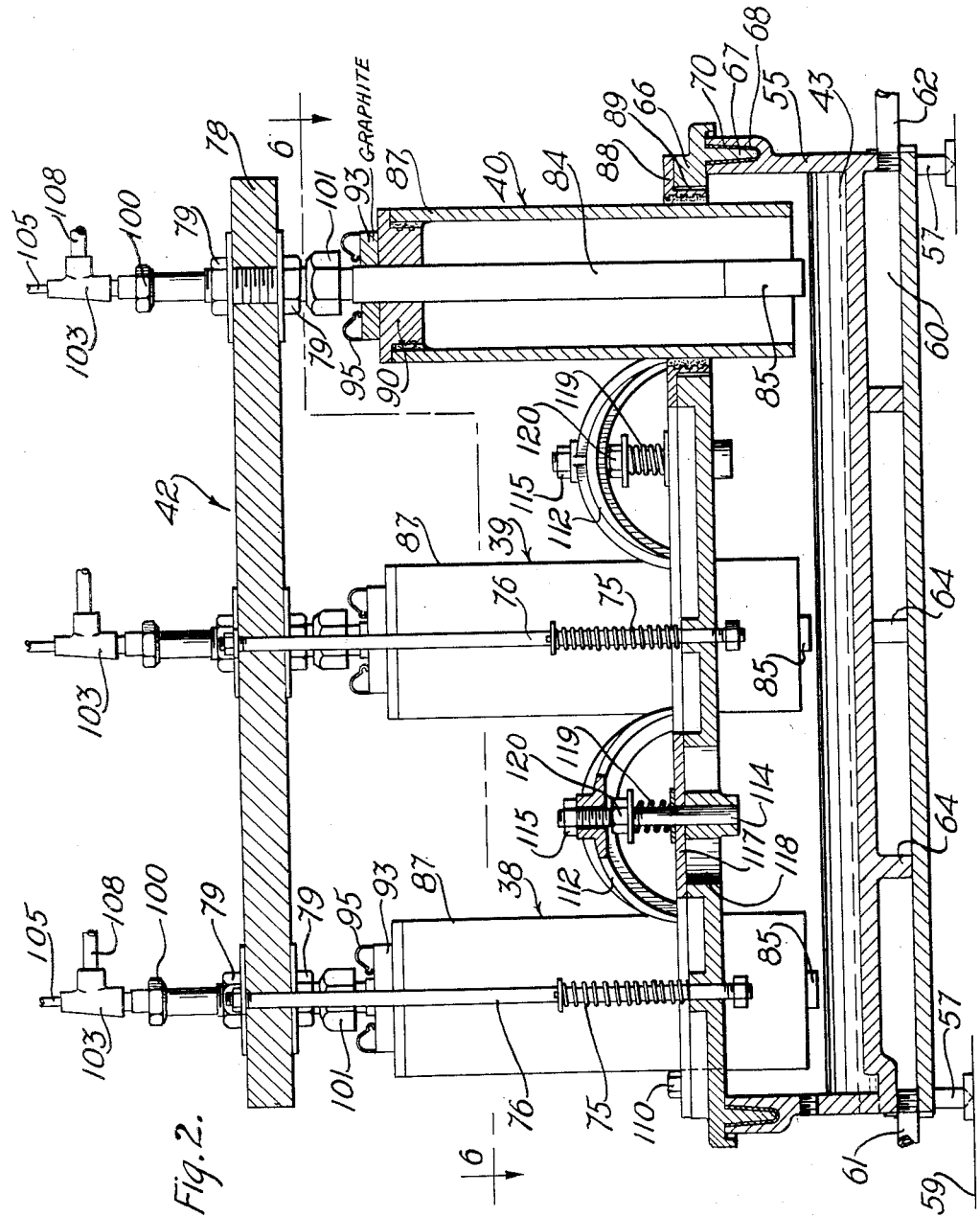
Fig. 2 is a vertical sectional view of the oscillator.
Figure 3:
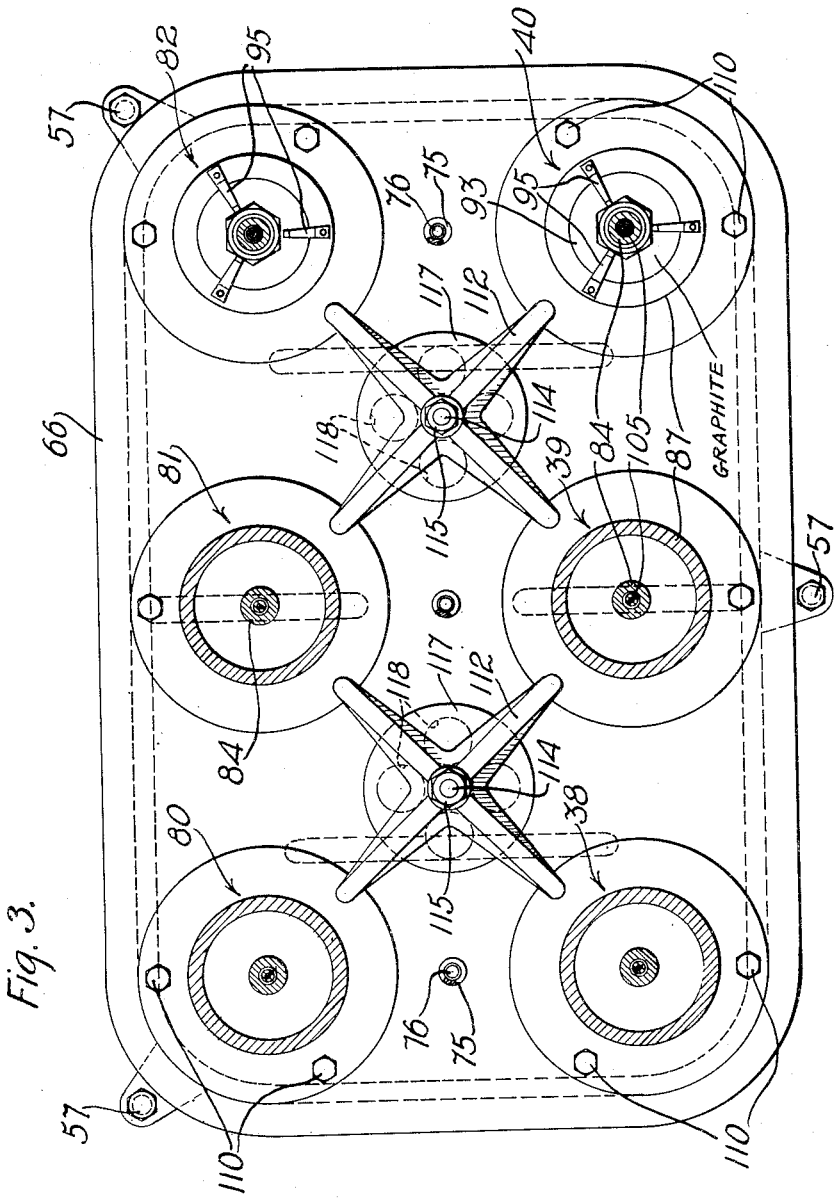
Fig. 3 is a horizontal sectional view taken on line 6—6 of Fig. 2.

Referring to Figs. 2 and 3 the oscillator 42 comprises a pot 55 which holds the mercury electrode 43 and is mounted by posts 57 upon a support 59. The posts 57 are threaded into the pot 55 and may be adjusted to level the pot upon the support 59. The pot 55 is provided with a chamber 60 which may be connected by pipes 61 and 62 to any suitable supply (not shown) of cooling fluid under pressure. Baffle plates 64 disposed in the chamber 60 cause the cooling fluid to circulate throughout all parts of the chamber so as to efficiently cool the pot 55 and the mercury electrode 43. The pot 55 is provided with a cover 66 having a tongue 67 positioned in a groove 68 formed in the pot. Mercury 70 disposed in the groove 68 forms a seal between the pot and its cover so that a hydrocarbonaceous atmosphere may be maintained within the pot, such atmosphere being obtained by introducing a hydrocarbonaceous fluid into the pot by any suitable means (not shown). The cover 66 is yieldingly urged against the pot 55 by compression springs 75 wound around rods 76 which depend from a relatively fixed support 78.

The electrodes 38, 39 and 40 and a plurality of spare electrodes 80, 81 and 82 project through the cover 66, all of these electrodes being substantially identical in structure and being mounted in substantially the same manner. As shown in Fig. 4 each of the metallic electrodes comprises a tubular member 84 upon the lower end of which is threaded a separable hollow tip 85, the tubular member 84 passing through a quartz tube 87 which is cemented in a collar 88 seated in an aperture 89 in the cover 66. The upper end of the quartz tube 84 is closed by a collar 90, through an opening 91 of which, the tubular member 84 passes, the opening 91 being sealed by a graphite gland 93 held in place by spring clips 95. The upper portion of the tubular member 84 is slidably mounted in a sleeve 97 secured to the support 78 by nuts 79 threaded upon the sleeve. Nuts 100 and 101 threaded upon the tubular member 84 and disposed at opposite ends of the sleeve 97 may be manipulated to raise and lower the tubular member 84 so that the tip 85 may be brought into a plurality of adjusted positions with respect to the mercury electrode 43. Threaded upon the upper end of the tubular member 84 is a T-fitting 103 through which a tube 105 projects and has its lower end disposed in the hollow tip 85. The tube 105 is connected to any suitable means (not shown) for supplying a cooling fluid under pressure to the tube which delivers the cooling fluid to the tip 85, the cooling fluid being discharged through the tubular member 84, the T-fitting 103 and a pipe 108 threaded into the T-fitting.

As shown in Figs. 2 and 3, each collar 88 is secured to the cover 66 by bolts 110 which are readily accessible if the quartz tube 87 is to be removed from the cover 66. The collars 88 are also held in their proper positions relative to the cover 66 by clamp members 112 slidably mounted on pins 114 rigidly secured in and projecting upwardly from the cover 66. Nuts 115 threaded upon the pins 114 may be manipulated to draw the clamp members 112 tightly against the collars 88. Slidably mounted upon the pins 114 are disks 117 adapted to close apertures 118 formed in the cover 66. Each disk is yieldingly held by a spring 119 in a position wherein it closes several of the apertures 118, the springs 119 being disposed around the pins 114 and being interposed between the disks and nuts 120 threaded upon the pins. This construction prevents the pressure within the pot 55 from rising above a predetermined value.

In the operation of the apparatus, the mains 30, 31 and 32 are connected to any suitable source (not shown) of electrical energy. The voltage of the current delivered to the mains is stepped up by the transformer 35 which then impresses the current upon the oscillator 42. The oscillator 42 transforms the current into a high frequency current which is supplied to the coil 16. The instruments 52 will indicate the load being carried by each phase and if an unbalanced condition obtains, it may be corrected by adjusting the tips 85 relative to the mercury electrode 43. Should one of the electrodes 38, 39 and 40 fail for any reason, it may be replaced in the circuit by one of the electrodes 80, 81 and 82.

What is claimed is:

1. In an oscillator for high frequency electrical heating apparatus, a mercury electrode, a plurality of metallic electrodes co-operating with the mercury electrode and each metallic electrode comprising a separable hollow tip extending within the container, means for adjusting a metallic electrode with respect to the mercury electrode and the other metallic electrodes, and means for passing a cooling fluid through the hollow tip.

2. In an oscillator for a high frequency electrical apparatus, a mercury electrode, a container for the mercury electrode having a circumferential groove, a cover for the container resting on the surface adjacent the groove and provided with a tongue extending into the groove, and a mercury seal between the tongue and the groove.

3. In an oscillator for a high frequency electrical apparatus, a mercury electrode, a container for the mercury electrode having a wall provided with a circumferential groove, a cover for the container supported by the wall and enclosing the groove, a tongue integral with the cover extending into the groove, a mercury seal between the tongue and the groove and an adjustable means for resiliently retaining the cover on the container.

4. In an oscillator for a high frequency electrical apparatus, a mercury electrode, a container for the mercury electrode having a circumferential groove, a cover cooperating with said groove to form an enclosed V-shaped cavity, a mercury seal in said cavity, and means for resiliently retaining the cover on the container.

5. In an oscillator for a high frequency electrical apparatus, a mercury electrode, a cointainer for the mercury electrode, a cover for the container having an opening therein, a tube extending into the opening, an electrode within the tube, and a graphite seal surrounding the electrode and closing the tube.

6. In an oscillator for a high frequency electrical apparatus, a mercury electrode, a plurality of hollow metallic electrodes adapted to receive a cooling fluid cooperating with the mercury electrode and spaced therefrom, a sleeve for supporting the metallic electrodes, and means for adjusting the electrodes within said sleeve to vary the distance between the electrodes.

7. In an oscillator for high frequency electrical heating apparatus, a container, a mercury electrode in the container, a cover for the container, and a plurality of electrodes cooperating with the mercury electrode and associated with the cover, means for individually adjusting each of the electrodes, means for sealing the electrodes in the container, and means for relieving excess pressure within the container.

In witness whereof, I hereunto subscribe my name this 28th day of January A. D., 1925.

ROSWELL CLARENCE RASMUSSEN.